(12) United States Patent
Ashcraft

(10) Patent No.: US 8,251,054 B1
(45) Date of Patent: Aug. 28, 2012

(54) DEVICE FOR COLLECTING SOLAR ENERGY TO PRODUCE HEAT

(76) Inventor: Derrell G. Ashcraft, El Dorado, AR (US)

( * ) Notice: Subject to any disclaimer, the term of this patent is extended or adjusted under 35 U.S.C. 154(b) by 259 days.

(21) Appl. No.: 12/660,566

(22) Filed: Mar. 1, 2010

Related U.S. Application Data

(63) Continuation-in-part of application No. 12/005,462, filed on Mar. 25, 2008, now abandoned.

(51) Int. Cl.
*F24J 2/38* (2006.01)

(52) U.S. Cl. ........ 126/600; 126/571; 126/572; 126/573; 126/574; 126/575; 126/576; 126/577; 126/605; 126/692; 126/696; 137/45; 239/97; 285/35

(58) Field of Classification Search ................ 126/571, 126/605, 692, 600; 285/35
See application file for complete search history.

(56) References Cited

U.S. PATENT DOCUMENTS

| | | | | |
|---|---|---|---|---|
| 257,560 A | * | 5/1882 | Deitzler | 126/694 |
| 820,127 A | * | 5/1906 | Pope | 126/605 |
| 2,913,583 A | * | 11/1959 | Regnier et al. | 250/203.4 |
| 3,171,403 A | * | 3/1965 | Drescher | 126/603 |
| 3,700,267 A | * | 10/1972 | Piegza | 285/24 |
| 3,999,389 A | | 12/1976 | Bryce | 60/641 |
| 4,030,890 A | | 6/1977 | Diggs | 23/281 |
| 4,071,608 A | | 1/1978 | Diggs | 426/579 |
| 4,090,498 A | | 5/1978 | Benson | 126/271 |
| 4,134,393 A | | 1/1979 | Stark et al. | 126/271 |
| 4,203,426 A | | 5/1980 | Matlock et al. | 126/425 |
| 4,243,019 A | * | 1/1981 | Severson | 126/634 |
| 4,289,118 A | | 9/1981 | Stark | 126/440 |
| 4,297,003 A | | 10/1981 | Hutchison | 350/292 |
| 4,306,540 A | | 12/1981 | Hutchison | 126/424 |
| 4,317,444 A | | 3/1982 | Maruko | 126/438 |
| 4,365,617 A | | 12/1982 | Bugash et al. | 126/425 |
| 4,372,027 A | | 2/1983 | Hutchison | 29/448 |
| 4,372,651 A | | 2/1983 | Hutchison | 350/292 |
| 4,380,995 A | | 4/1983 | Robertson | 126/438 |
| 4,387,702 A | * | 6/1983 | Murphy et al. | 126/581 |
| 4,419,981 A | | 12/1983 | Mori | 126/425 |
| 4,440,155 A | | 4/1984 | Maloof et al. | 126/440 |
| 4,484,568 A | | 11/1984 | Witt | 126/438 |
| 4,498,456 A | | 2/1985 | Hashizume | 126/425 |
| 4,510,385 A | | 4/1985 | Welman | 250/203 |
| 4,586,488 A | | 5/1986 | Noto | 126/425 |
| 4,644,933 A | | 2/1987 | Gregory | 126/424 |
| 4,649,899 A | | 3/1987 | Moore | 126/425 |
| 4,856,494 A | * | 8/1989 | Schussler et al. | 126/601 |
| 4,870,949 A | | 10/1989 | Butler | 126/424 |
| 4,875,052 A | * | 10/1989 | Anderson et al. | 343/882 |
| 4,934,324 A | * | 6/1990 | Lenz | 126/663 |
| 4,977,744 A | * | 12/1990 | Lenz | 60/641.15 |
| 5,024,211 A | * | 6/1991 | Winzen | 126/571 |
| 5,113,845 A | | 5/1992 | Nix | 126/451 |

(Continued)

*Primary Examiner* — Kenneth Rinehart
*Assistant Examiner* — Jorge Pereiro
(74) *Attorney, Agent, or Firm* — Keisling & Pieper PLC; Stephen D. Schrantz

(57) ABSTRACT

A machine for tracking the sun's movement and concentrating sunlight consists of a main frame which pivots in the north and south direction on a base having conduit for a heat medium (a liquid usually of the Glycol family the main frame supports the mirror frame that pivots 360 degrees East to West allowing the mirror to focus the sunlight onto the conduit heating the liquid medium producing a very high and concentrated amount of heat during the entire daylight period and can be used for a small business or residential heating. An optional prism can be attached to the mirror frame to focus sun rays onto the conduit for added heat.

8 Claims, 6 Drawing Sheets

U.S. PATENT DOCUMENTS

| | | | |
|---|---|---|---|
| 5,191,875 A | 3/1993 | Edling et al. | 126/576 |
| 5,531,216 A | 7/1996 | Nicklas et al. | 126/599 |
| 5,540,217 A | 7/1996 | Myles, III et al. | 126/692 |
| 5,564,410 A | 10/1996 | Myles, III et al. | 126/621 |
| 5,655,515 A | 8/1997 | Myles, III et al. | 126/601 |
| 5,673,684 A | 10/1997 | Myles, III et al. | 126/694 |
| 5,787,877 A | 8/1998 | Nicklas et al. | 126/601 |
| 6,035,850 A | 3/2000 | Deidewig et al. | 126/696 |
| 6,302,099 B1 | 10/2001 | McDermott | 126/600 |
| 6,363,928 B1 | 4/2002 | Anderson, Jr. | 126/577 |
| 6,617,506 B2 | 9/2003 | Sasaki | 136/246 |
| 7,231,128 B2 * | 6/2007 | Muhs et al. | 385/88 |
| 2004/0118447 A1 * | 6/2004 | Muhs et al. | 136/246 |
| 2010/0213704 A1 * | 8/2010 | Burger et al. | 285/223 |

* cited by examiner

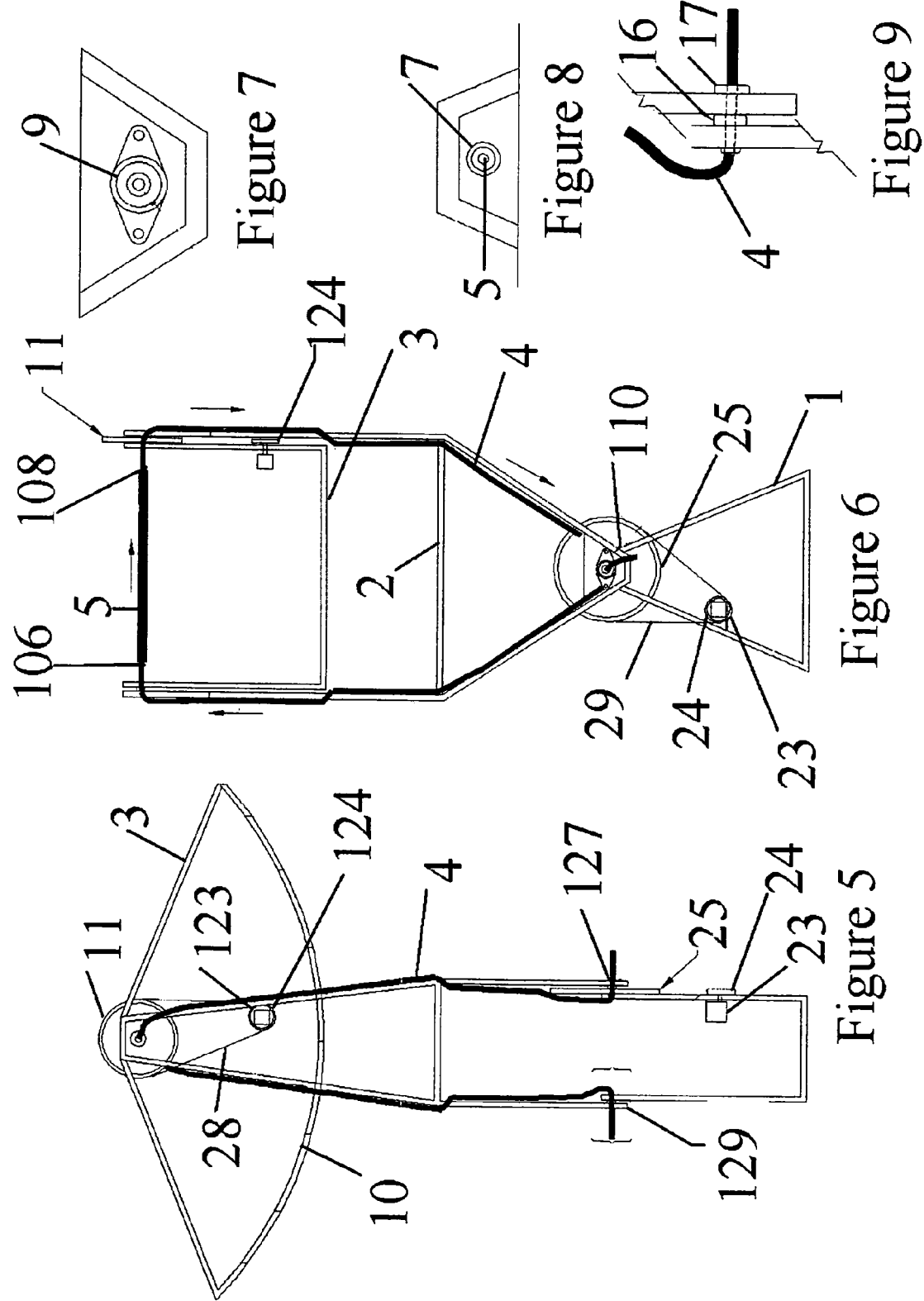

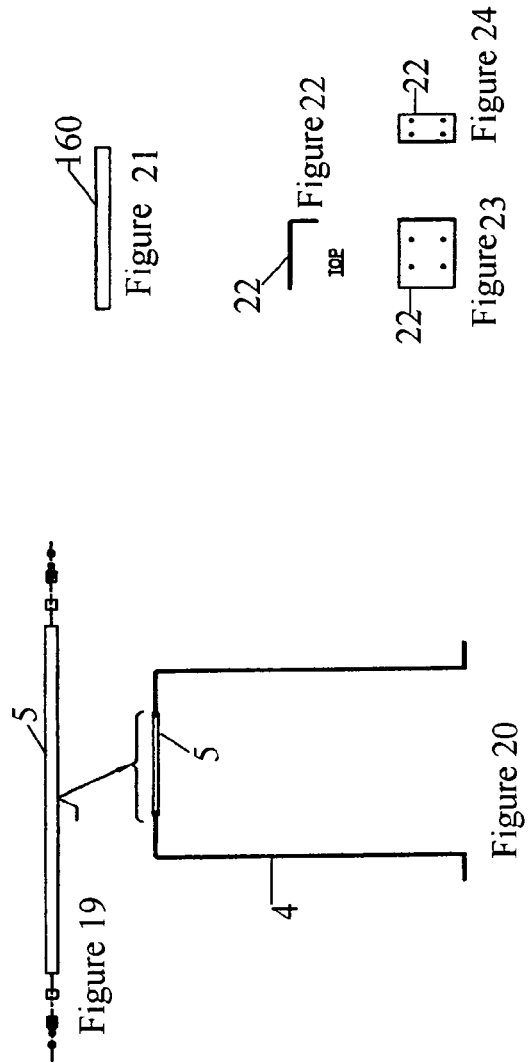
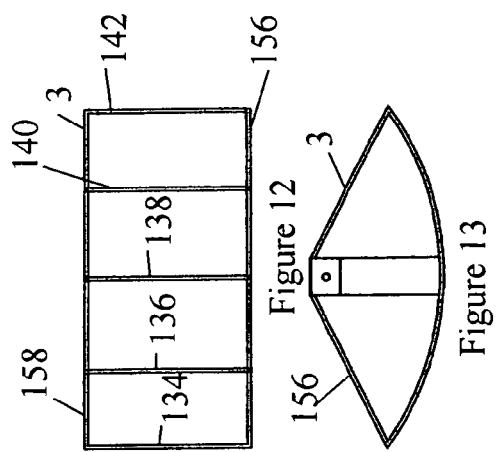
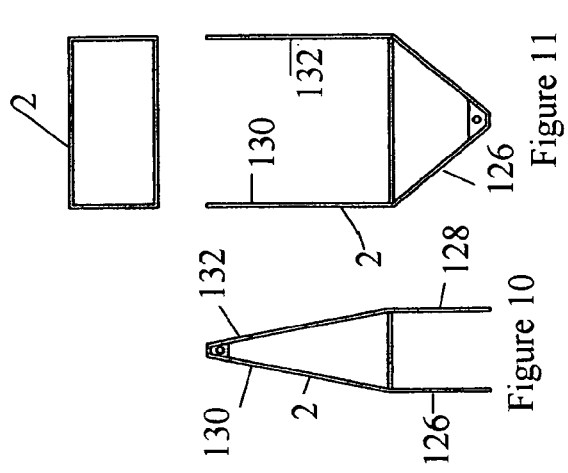
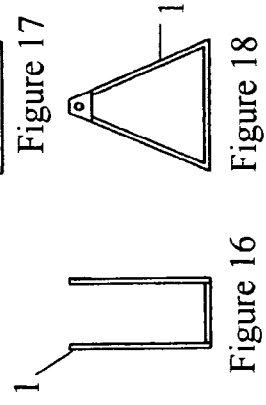

DEVICE FOR COLLECTING SOLAR ENERGY TO PRODUCE HEAT

CROSS-REFERENCE TO RELATED APPLICATIONS

This application claims priority to and is a continuation-in-part of U.S. patent application Ser. No. 12/005,462 filed on Mar. 25, 2008 now abandoned entitled DEVICE FOR COLLECTING SOLAR ENERGY TO PRODUCE HEAT.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

This invention relates generally to the collecting/concentrating solar energy to produce heat. In the past, solar collectors generally have been set up in clear, dry desert air. In the late 1800's a group of solar energy enthusiasts, with their solar equipment traveled to North Africa and the Sahara Desert. With their troughs installed, they discovered that their equipment was only efficient for part of the day. The huge fields of troughs employed by utility companies today move with the sun only from east to west.

By not changing direction with the season, today's troughs are not highly efficient. This invention solves the partial problem of season change. Therefore, the present invention is more efficient.

DESCRIPTION OF THE KNOWN ART

Patents and patent applications disclosing information relevant to solar energy are disclosed below. These patents and patent applications are hereby expressly incorporated by reference in their entirety.

U.S. Pat. No. 3,999,389 to Bryce issued on Dec. 28, 1976 ("the '389 patent") teaches a solar energy collector converter apparatus employing a closed energy conversion cycle utilizing alcohol as the conversion medium and incorporating a solar energy collector which is equipped to follow the sun.

U.S. Pat. No. 4,498,456 issued to Hashizume on Feb. 12, 1985 ("the '456 patent") teaches a self-tracking mechanism for a solar collector that comprises a plurality of sensor concentrators arranged side by side and a plurality of shape memory alloy coils each located at a position coincident with the focal line of the corresponding one of sensor concentrators. The '456 patent teaches that the shape memory alloy coil is treated so as to shrink into a memorized shape when heated. Each of a plurality of tension wires taught by the '456 patent have one end connected to one end of the shape memory alloy coil and the other end wound up on a wire drum which is mounted on a drive shaft. A transfer mechanism taught by the '456 patent is operatively connected to the drive shaft for transferring the rotation of the drive shaft to a rotatable main collector.

U.S. Pat. No. 6,363,928 issued to Anderson on Apr. 2, 2002 ("the '928 patent") teaches a solar tracking mechanism that is utilized in connection with a solar energy collection system. The collection system taught by the '928 patent includes a light reflective shell shaped to focus solar radiation on a radiation absorbing segment of a tube which carries a heat transfer fluid. The shell taught by the '928 patent is pivotally mounted on a support frame. The '928 patent teaches an actuator mounted between the support frame and the shell rotatably the shell. A solar sensor taught by the '928 patent is mounted deep within a sighting tube which is fixed to the shell such that a line of sight through the sighting tube is at least parallel to the optical axis of the shell. The solar sensor taught by the '928 patent generates a sensor signal which is used as a control input to an actuator control system. End limit switches taught by the '928 patent generate a limit stop signals when the shell reaches maximum angular positions. The actuator control system taught by the '928 patent generates fluid flows to the actuator based the solar sensor signal and the limit stop signals. The '928 patent teaches that the method of tracking the sun includes providing a solar cell array, activating the solar collection system when solar radiation illuminating the array exceeds a predetermined threshold, providing a solar sensor shielded from the solar radiation except for direct, aligned radiation, pivotally rotating the shell westward based upon the solar sensor signal, stopping the shell at a maximum angular positions, and rotating the shell westward if the shell does not reach the maximum westward angular orientation during a predetermined daylight time period. The solar energy collection system taught by the '928 patent may be further configured to include a bisected shell, which are hinged together. The '928 patent teaches that the shell halves can be collapsed onto each other thereby protecting the light reflective surface and the radiation absorbing segment of the tube carrying heat transfer fluid.

Therefore, the present invention is needed to improve the transfer of solar energy to a fluid flowing through a heating conduit heated by a reflective surface. The present invention is also needed to increase the efficiency of heating a conduit. The present invention is also needed to decrease movement of the conduit as the reflective surface pivots on two axes.

SUMMARY OF THE INVENTION

The present invention, with its twelve-volt motors, is capable of following the sun from sunrise to sunset. The moveable mirror, capable of 360° in its torrent, keeps the sun focused on the receiving tube. The mainframe tilts from North to South, keeping the sun in full focus during the changing seasons.

The tubing and receiver may contain glycol, mineral oil, petroleum oil, or any medium not affected by the weather.

The medium oil contained in the tubing system may be (350°) transferred by pump to any other system for practical use, such as water heater, producer of steam, etc.

All the sunshine sensing and relay energizing is accomplished by use of red rock component (led 3×).

The present invention provides a reflective surface that concentrates the sun's energy to a heating conduit. The reflective surface of the present invention pivots on two axes to increase the reflection onto the heating conduit. Fluid of the present invention flows through the conduit heated by the reflective surface to absorb the sun's energy. The present invention improves the flow of the fluid through the conduit by limiting movement of the conduit.

It is an object of the present invention to heat a fluid flowing through the conduit.

It is another object of the present invention to reflect the sun's energy to a conduit with a reflective surface that adjusts on two axes to increase the concentration of the sun's energy.

It is another object of the present invention to limit movement of the conduit through which the fluid flows to decrease manufacturing costs and to decrease service costs.

It is another object of the present invention to limit movement of the conduit through which the fluid flows to eliminate movement that may cause leaks and loss of the fluid.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 5 is a side view of one embodiment of the present invention.

FIG. 6 is a front view thereof.

FIG. 7 is an enlarged view of one portion of one embodiment of the present invention.

FIG. 8 is an enlarged view of another portion of one embodiment of the present invention.

FIG. 9 is a cross sectional view of one embodiment of the present invention.

FIG. 10 is a side view of the adjustment body of one embodiment of the present invention.

FIG. 11 is a front view thereof

FIG. 12 is a top view of the collector frame of one embodiment of the present invention.

FIG. 13 is a side view thereof

FIG. 14 is a side view thereof.

FIG. 15 is a top view of a reflective surface of one embodiment of the present invention.

FIG. 16 is a side view of the base of one embodiment of the present invention.

FIG. 17 is a top view thereof.

FIG. 18 is a front view thereof.

FIG. 19 is a front view of the heating conduit of one embodiment of the present invention.

FIG. 20 is a front partial view of the heating conduit and supply conduit of one embodiment of the present invention.

FIG. 21 is a side view of the prism of one embodiment of the present invention.

FIG. 22 is a top view of a mounting plate of one embodiment of the present invention.

FIG. 23 is a front view thereof.

FIG. 24 is a side view thereof.

DETAILED DESCRIPTION

The present invention, with its twelve-volt motors, is capable of following the sun from sunrise to sunset. The moveable mirror, capable of 360° in its torrent, keeps the sun focused on the receiving tube. The mainframe tilts from North to South, keeping the sun in full focus during the changing seasons.

The tubing and receiver may contain glycol, mineral oil, petroleum oil, or any medium not affected by the weather. The medium oil contained in the tubing system may be (350°) transferred by pump to any other system for practical use, such as water heater, producer of steam, etc. All the sunshine sensing and relay energizing is accomplished by use of red rock component (led 3×).

Figure 1:
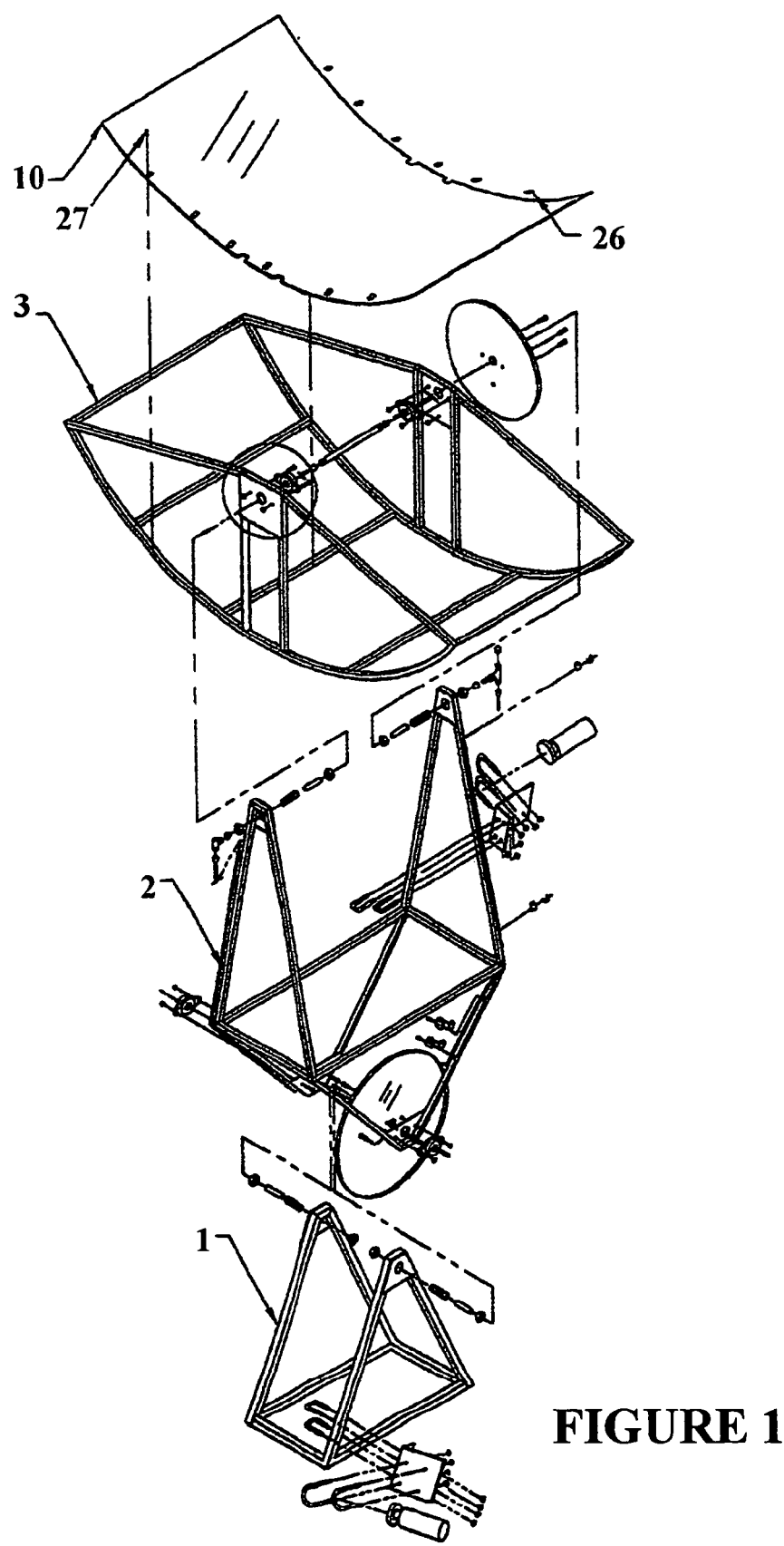
FIG. 1 is an exploded view of the present invention.

Referring to FIG. 1, the present invention allows tracking of the sun on two different axes. In one embodiment, the present invention rotates on a first axis and a second axis, substantially perpendicular to the first axis, to allow for tracking of the sun from east to west and north to south. Thus, the present invention tracks the sun during the day and adjusts according to the time of year. Reflective surface 10 focuses the sunlight onto heating conduit 5. Reflective surface 10 mounts onto the present invention such that reflective surface 10 may be positioned on two different axes for tracking the sun. In one embodiment, reflective surface 10 mounts on collector frame 3 for movement on a single axis for tracking the sun on a daily basis from east to west. Collector frame 3 pivotally mounts to adjustment body 2 for pivoting of collector frame 3 and reflective surface 10 in relation to adjustment body 2. Adjustment body 2, likewise, pivotally attaches to base 1 for pivoting adjustment body 2 on the second axis. The pivoting of adjustment body 2 allows the present invention to track the sun on a second axis.

Figure 2:
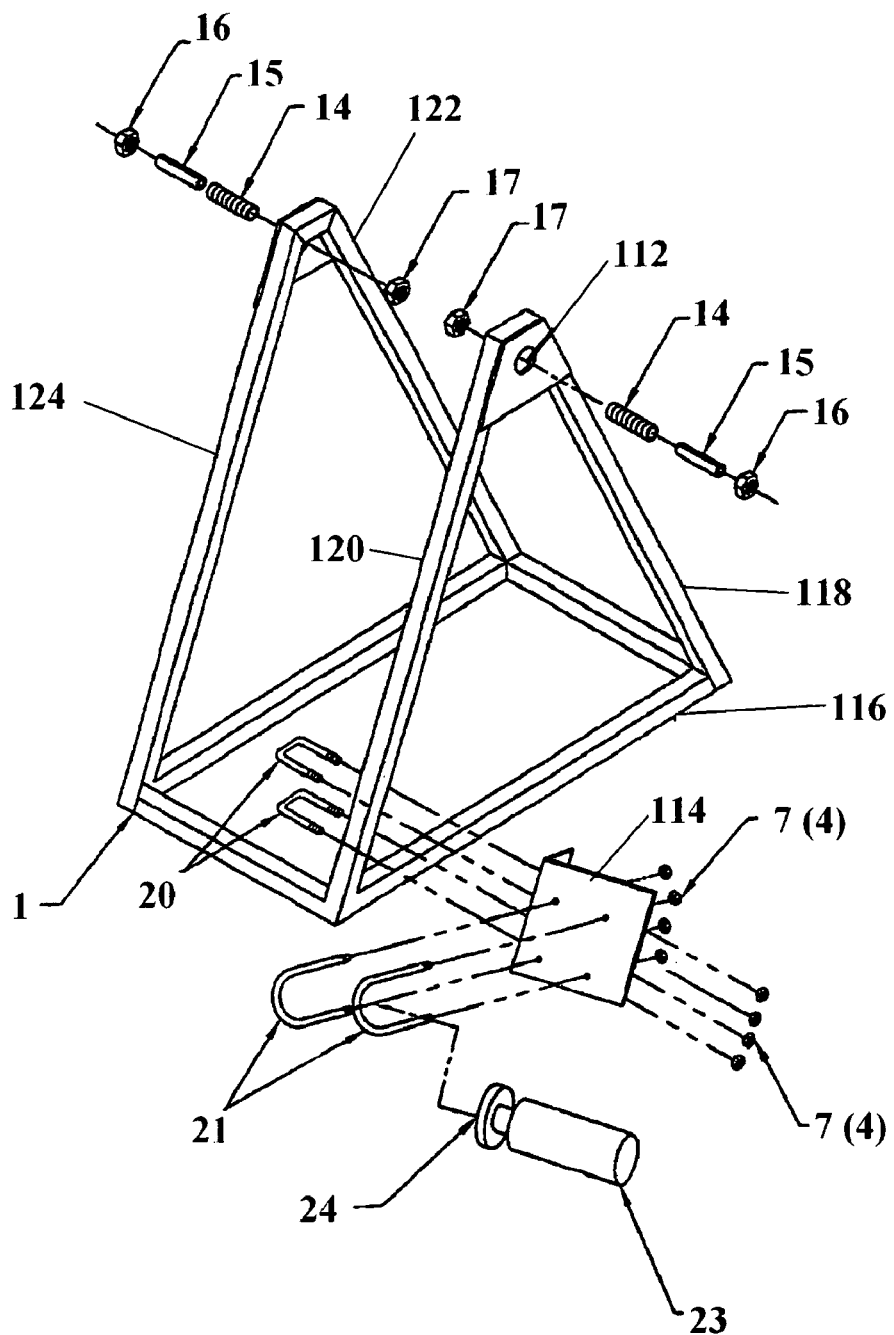
FIG. 2 is an exploded view of the base of the present invention.

Referring to FIG. 2, base 1 rests upon a surface such as the ground or other surface. Motor 23 attaches to base 1 at mounting body 114. In one embodiment, base 1 provides a surface contact 116 forming a parallelogram for contact with the surface. Four legs 118 extend upward from the surface contact 116 to meet at the top to form two different triangles. The two legs 118, 122 and two legs 120, 124 extend from surface contact 116. Leg 118 and leg 122 extend parallel from each other and leg 120 and leg 124 extend parallel from each other. Legs 118 and 120 meet at an upper portion of base 1. Likewise, legs 122 and 124 meet at an upper portion of base 1. The upper portion of base 1 provides a mounting aperture 112 for attachment of adjustment body 2. Fasteners pivotally attach adjustment body 2 to base 1.

Figure 3:
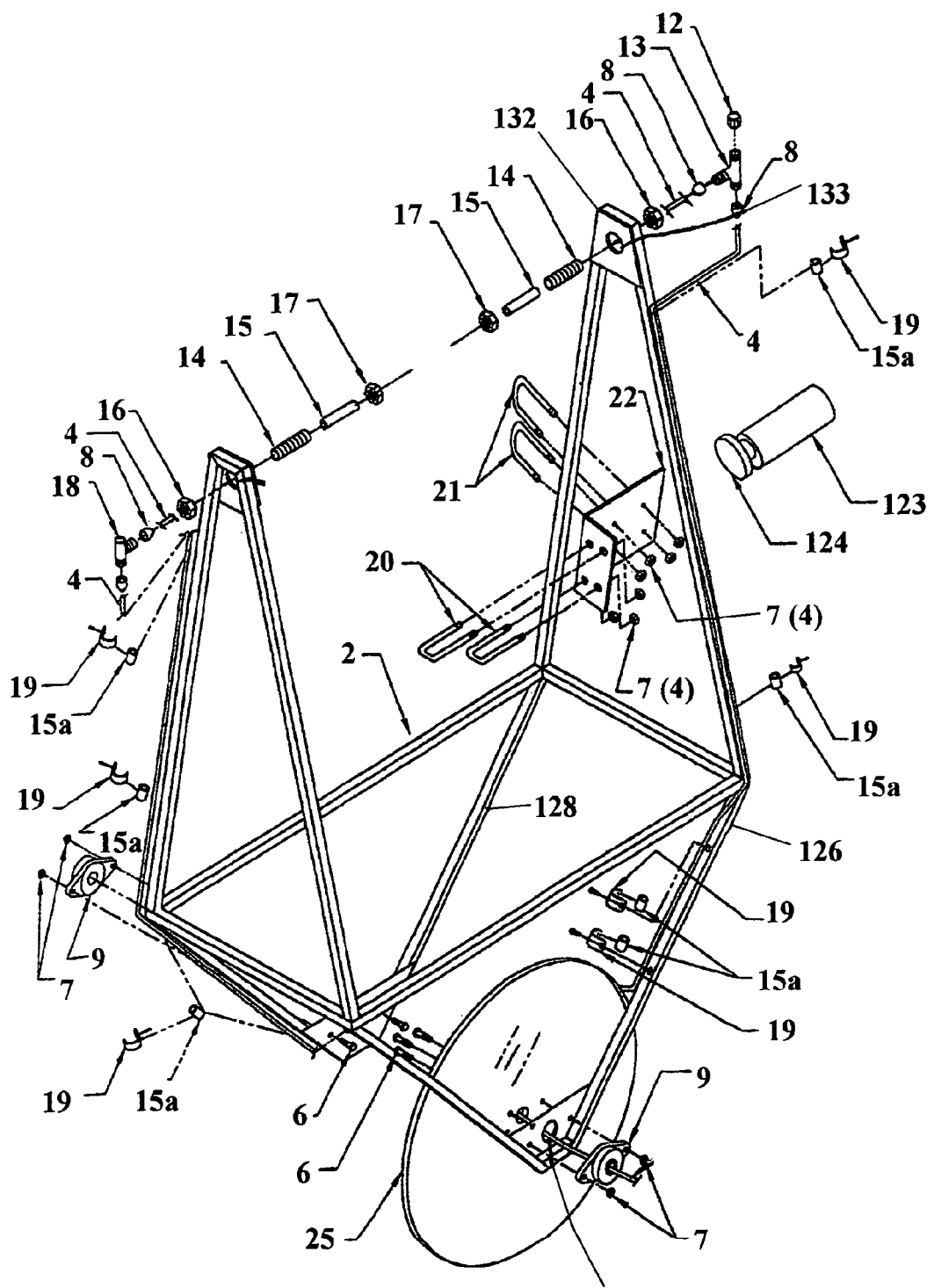
FIG. 3 is an exploded view of the main frame of the present invention.

Referring to FIGS. 3 and 6, adjustment body 2 pivotally attaches to base 1. Pivot body 25, a pulley in one embodiment, attaches to adjustment body 2. Motor 23 attached to base 1 pivots adjustment body 2. Belt 29 attaches to a driving body 24 secured to motor 23, such as a shaft, and pivot body 125. Motor 23 rotates driving body 24 thus translating into movement of belt 29. As the belt 29 moves, the belt 29 rotates pivot body 25. The rotation of pivot body 25 pivots adjustment body 2 for tracking the sun on an axis, such as north and south.

Attachment legs 126, 128 of adjustment body 2 pivotally attach to base 1. Attachment legs 126, 128 extend downwards in a V-shape to be secured to base 1. Pivot body 25 attaches to attachment leg 126. Attachment arms 130, 132 extend upwards from adjustment body 2. Attachment arms 130, 132 form a V-shape to support collector frame 3. Attachment arms 130, 132 provide pivoting apertures 131, 133 for the supply conduit 4 to attach with the heating conduit 5. Reflective surface 10 also attaches to adjustment body 2 at pivoting apertures 131, 133. Therefore, reflective surface 10 pivots around heating conduit 10 so that the reflective surface 10 will concentrate the sun's energy towards the heating conduit 10.

Referring to FIGS. 3 and 5-6, reflective surface 10 mounts onto collector frame 3. The collector frame 3 supports the reflective surface 10 during the tracking of the sun on one axis. In one embodiment, collector frame 3 tracks the sun from east to west. Heating conduit 5 passes through conduit apertures 149, 153 of collector frame 3. Heating conduit 5 does not adjust during the movement of collector frame 3 during the tracking of the sun by collector frame 3. Pulley 11 adjusts the collector frame 3 on one axis for tracking the sun. The movement of collector frame 3 will be described in greater detail with reference to FIG. 4.

Collector frame 3 pivotally attaches to adjustment body 2 for movement on a single axis. Collector frame 3 pivots in relation to adjustment body 2 to allow collector frame 3 to track the sun on a single axis. Adjustment body 2 pivotally attaches to base 1 for pivoting of adjustment body 2 on a single axis. Attachment arms 130, 132 of adjustment body 2 extend upwards for attachment of collector frame 3. Collector frame 3 pivotally attaches to attachment arms 130, 132. The pivoting of adjustment body 2 on one axis and collector frame 3 on another axis enables reflective surface 10 to track the movement of the sun on two different axes. Conduit apertures 131, 133 of adjustment body 2 enable the connection of heating conduit 5 to supply conduit 4. The extension of attachment arms 130, 132 above the main portion of adjustment body 2 elevates the collector frame 3 such that collector frame 3 may pivot freely without contacting the main portion of adjustment body 2. The extension of attachment arms 130, 132 also elevate heating conduit 5 substantially proximate to the pivot point of the reflective surface 10 for heating the fluid within heating conduit 5.

Motor 123 attaches to adjustment body 2 for movement of collector frame 3 and reflective surface 10. Motor 123 attaches to driving body 24. Driving body 24 accepts belt 28 for adjustment of belt 28. Belt 28 also attaches to pivoting body 11. As driving body 24 secured to motor 123 adjusts belt 28, belt 28 also adjusts pivoting body 11. Collector frame 3 and reflective surface 10 pivot during movement of pivoting body 11 for tracking of the sun's movement by reflective surface 10.

Figure 4:
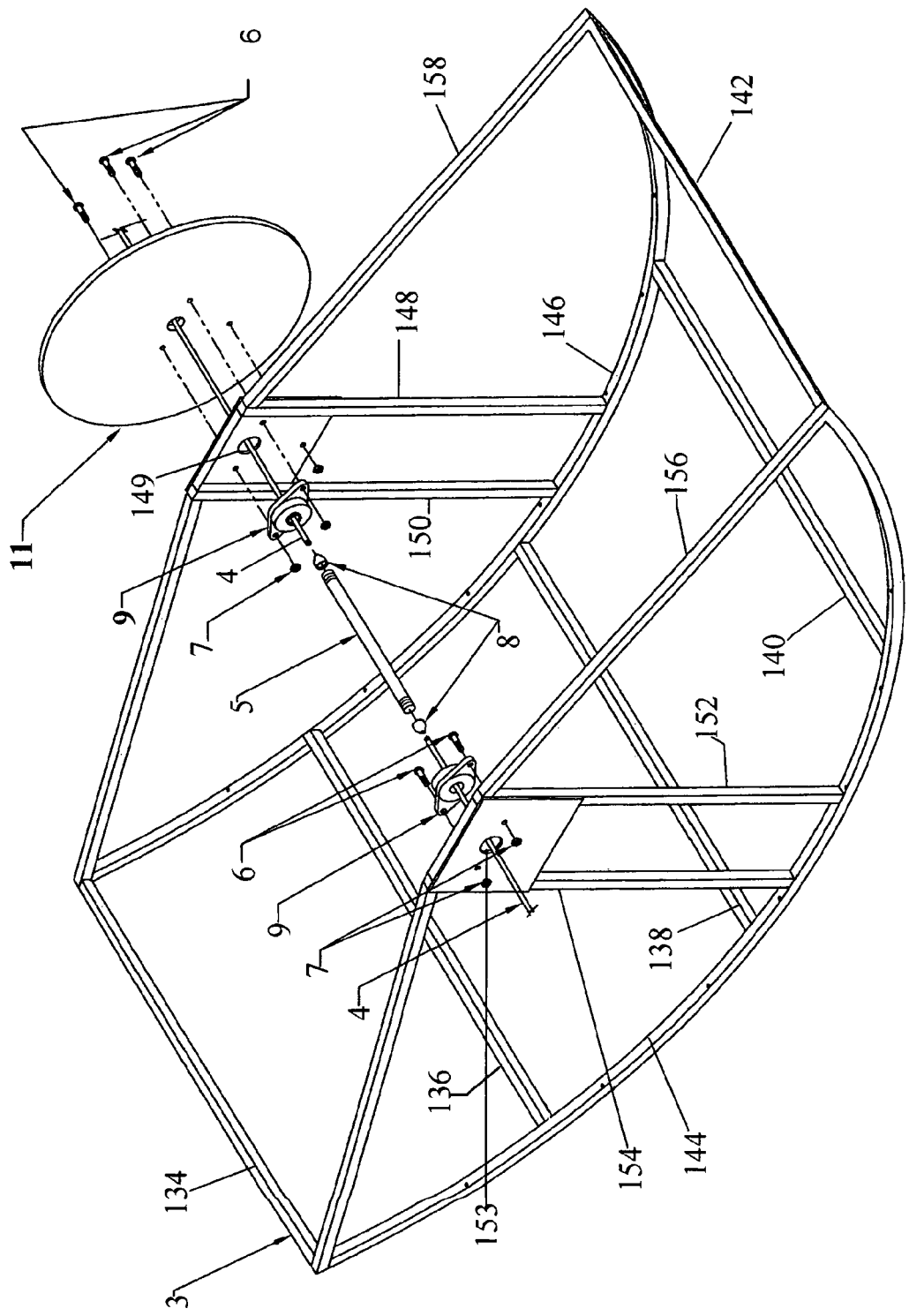
FIG. 4 is an exploded view of the reflective frame of the present invention.

Referring to FIG. 4, collecting frame 3 provides supports 134, 136, 138, 140 adapted to support the reflective surface 10. Side supports 144, 146 also support reflective surface 10 as reflective surface 10 tracks the movement of the sun. Vertical supports 148, 150, 152, 154 extend upwards from collecting frame 3. Vertical supports 148, 150, 152, 154 provide attachment apertures 149, 153 for attachment of the collecting frame 3 to pivot body 11 and adjustment body 2. As stated above, pivoting body 11 attaches to collector frame 3. Belt 28 adjusts pivoting body 11 to pivot collector frame 3 and reflective surface 10. Attachment apertures 149, 153 provide the proximate location for attachment of collector frame 3 and reflective surface 10 such that reflective surface 10 pivots around attachment apertures 149, 153. The attachment apertures 149, 153 allow fasteners to pass through attachment apertures 149, 153 for attachment of collector frame 3 to adjustable body 2 through the pivoting apertures 131, 133. In one embodiment, heating conduit 5 and supply conduit 4 pass through attachment apertures 149, 153 and pivoting apertures 131, 133 such that reflective surface 10 pivots around heating conduit 5. In such an embodiment, reflective surface 10 revolves around heating conduit 5.

Referring to FIGS. 5 and 6, the present invention provides a heating conduit 5 for heating a fluid. A reflective surface 10 adjusts on a first axis and a second axis to follow the movement of the sun. The reflective surface 10 reflects solar rays towards the heating conduit 5 to heat the fluid found in the heating conduit 5. Reflective surface 10 pivots around heating conduit 5. In one embodiment, heating conduit 5 provides the central point around which heating conduit 5 pivots. In one embodiment of the present invention, the reflective surface 10 is a concave mirror. The heating conduit 5 provides a passageway for movement of the fluid. The heating conduit 5 has two ends, an entrance end 106 and an exit end 108. The entrance end 106 of the heating conduit 5 allows the fluid to enter the heating conduit 5 to be heated. The exit end 108 of the heating conduit 5 allows the heated fluid to exit the heating conduit 5.

The present invention also provides a supply conduit 4 attached to the heating conduit 5. The supply conduit 4 provides a passageway for transferring the fluid that needs to be heated toward the heating conduit 5 to be heated. As the fluid passes from the supply conduit 4 through the entrance end 106 of heating conduit 5, the fluid is heated from direct solar rays and reflected solar rays from the reflective surface 10. As the fluid heats, the fluid flows through heating conduit 5 towards exit end 108. The supply conduit 4 also provides a passageway for transferring the fluid away from the heating conduit 5 for use. After flowing through exit end 108, the fluid enters supply conduit 4 to be transferred for use. As the fluid flows away from heating conduit 5, the fluid loses some of its heat. The present invention provides a cycle for continued use of the fluid. As the fluid loses heat, the fluid returns through supply conduit 4 to be reheated in the heating conduit 5 as shown in FIG. 6.

The movement of the present invention to follow the sun to improve the efficiency of the present invention will now be described in greater detail. As discussed above, the reflective surface 10 reflects solar rays towards the heating conduit 5. The reflective surface 10 adjusts on a first axis and a second axis to track the movement of the sun during the day and throughout the year. The reflective surface 10 pivotally attaches to adjustment body 2. The pivotal attachment of the reflective surface 10 allows the reflective surface 10 to adjust on a first axis. In one embodiment of the present invention, pivoting of the reflective surface 10 on the first axis allows the present invention to track the daily movement of the sun. The heating conduit 5 does not move as the reflective surface 10 adjusts on the first axis. Attachment apertures 149, 153 provide the proximate location for attachment of collector frame 3 and reflective surface 10. Reflective surface 10 pivots around attachment apertures 149, 153. Because heating conduit 5 and supply conduit 4 pass through attachment apertures 149, 153, reflective surface 10 also pivots around heating conduit 5 and supply conduit 4. In one embodiment of the present invention, heating conduit 5 and supply conduit 4 remain fixed as the reflective surface 10 pivots on the first axis with the collector frame 3.

The present invention also provides movement of the reflective surface 10 on a second axis during the movement of the adjustment body 2. The adjustment body 2 pivots on a single axis, distinct from the axis that the collector frame 3 pivots. The pivoting of adjustment body 2 allows adjustment of the reflective surface 10 on the second axis. The supply conduit 4 pivots with the adjustment body 2. The attachment of the supply conduit 4 with the adjustment body 2 allows supply conduit 4 to pivot with adjustment body 2. Therefore, the supply conduit 4 remains fixed in relation to the adjustment body 2. The supply conduit 4 is fixedly attached to the heating conduit 5 such that heating conduit 5 remains in a fixed position during pivoting of the reflective surface 10 on the collecting frame 3.

The present invention also provides exchange conduit 110 for transferring the fluid from the supply conduit 4 to be used. As the fluid is transferred away from heating conduit 5, the fluid loses heat. After the fluid transfers heat gained from heating conduit 5 during use of the fluid, the fluid flows from exchange conduit 110 to supply conduit 4 and heating conduit 5 for reheating. As stated above, heating conduit 5 and supply conduit 4 adjust with the pivoting of adjustment body 2. To allow such movement, supply conduit 4 rotatably attaches to exchange conduit 110. As seen in FIGS. 3 and 5-6, supply conduit 4 enters conduit attachment 127 of adjustment body 2. Conduit entrance 127 and conduit exit 129 allow supply conduit 4 to extend approximately perpendicular to the axes on which adjustment body 2 pivots. Such attachment allows supply conduit 4 to pivot with adjustment body 2. The pivoting of supply conduit 4 with attachment body 2 limits the number of pivotal attachments to supply conduit 4 to two different connections, each exterior of conduit entrance 127 and conduit exit 129. The two pivotal attachments occur at the joining of supply conduit 4 to exchange conduit 110.

In one embodiment of the present invention, reflective surface 10 adjusts at least 180 degrees on the first axis to allow daily tracking of the sun as the Earth rotates. Another embodiment allows 360 degrees of movement of the reflective surface 10. The 360 degree movement of reflective surface 10 allows reflective surface 10 to pivot around heating conduit 5 to serve as a shelter for heating conduit 5. The reflective surface 5 may be adjusted to a protect position in which the reflective surface blocks rain, dirt, snow, and other environment factors that may affect the heating conduit 5. One embodiment of the present invention also allows reflective surface 10 to adjust at least 180 degrees on the second axis to track the sun as the Earth revolves around the sun. The adjustment of the reflective surface 10 allows the present invention to heat the liquid to a minimum of at least 350 degrees Fahrenheit.

FIGS. 10 and 11 show the adjustment body 2. In one embodiment, adjustment body 2 provides attachment arms 130, 132 that extend 70 to 90 inches above the central portion of adjustment body 2, 81.5 inches in one embodiment. Attachment arms 130, 132 extend approximately 45 to 65 inches apart, 52 inches in one embodiment. Attachment legs 126, 128 extend approximately 15 to 40 inches below the central portion of adjustment body 2, approximately 28¾ inches in one embodiment.

FIGS. 12-14 show the collector frame 3. Supports 134, 135, 138, 140, 142 extend approximately 40 to 60 inches in length, 48 inches in one embodiment.

FIG. 15 shows the reflective surface 10 for concentrating the solar energy to the heating conduit 5. In one embodiment, the reflective surface 10 is a concave mirror that is 47 inches× 96 inches. The reflective surface 10 is shaped to be supported by the collector frame 3.

FIGS. 16-18 show base 1. Base 1 provides a surface contact 116 ranging from 1 to 4 inches in thickness, 1.5 inches in one embodiment. In one embodiment, the surface contact ranges from 15 to 40 inches in width and 30 to 50 inches in length, preferable 21¾ inches by 40 inches. The base 1 provides legs 118, 120, 122, 124 that extend approximately 40 inches in height.

FIGS. 19 and 20 show the heating conduit 5 and supply conduit 4. FIG. 19 shows heating conduit 5 as 1 inch copper tubing. Other types of tubing or plumbing material may be used for the heating conduit 5. FIG. 20 shows that the supply conduit 4 is smaller in diameter than the heating conduit 5. In one embodiment, the supply conduit 4 is ⅜ inch copper tubing.

FIG. 20 shows that supply conduit 4 and heating conduit 5 are attached such that heating conduit 5 adjusts with supply conduit 4 as the reflective surface 10 tracks that sun.

FIG. 21 shows a prism that may be attached to the heating conduit 5 to further concentrate the suns' energy onto the heating conduit 5.

FIGS. 22-24 show the mounting body 22 for attaching the motors 23, 123 to the base 1 and adjustment body 2 respectively.

REFERENCE NUMBERS IN DRAWING

1. COLLECTOR BASE
2. COLLECTOR MAIN FRAME
3. COLLECTOR MIRROR FRAME
4. ⅜" COPPER TUBING
5. 1" STAINLESS TUBING (29")
6. 1½"×½" BOLT
7. ½" NUT
8. ⅜" FLARE NUT WITH COMPRESSION RING (6)
9. BEARING & HOUSING (8)
10. 4'×8'×¼" TEDLAR SURFACED OR POLISHED STAINLESS MIRROR
11. 24" PULLEY (1)
12. ⅜" FEMALE PIPE CAP (1)
13. ⅜" FLOARE TO FLARE TO FLARE TEE (1)
14. 1⅛" OD×⅞" ID×4" TREADED NIPPLE (4)
15. ¾" OD×⅜" ID×4" INSULATION (8)
15A. ¾" OD×⅜" ID×1.25" INSULATION (8)
16. 1⅛" NUT (8)
17. 1⅛" LOCK NUT (8)
18. ⅜" ALL-TUBE ELBOW WITH COMPRESSION RINGS
19. ¾" EMT CLAMP WITH SCREW (90° BEND STRAIGHTENED) (8)
20. U BOLT ½×1¾×2½ (4)
21. U BOLT ½×4½×6 (4)
22. MOTOR MOUNTING PLATE (2)
23. 12V 20 AMP MOTOR (2)
24. 3" PULLEY (2)
25. 30" PULLEY (1)
26. ¼" STEEL OFFSET MIRROR HOLDER (16)
27. ⅛×½" SCREW (16)
28. 150" V BELT
29. 170" V BELT

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A device for collecting solar energy from solar rays comprising:
   a heating conduit for heating a fluid, the heating conduit adapted to receive solar rays reflected from a reflective surface, the heating conduit having an entrance end and an exit end, the entrance end of the heating conduit allowing the fluid to enter the heating conduit, the exit end of the heating conduit allowing the fluid to exit the heating conduit;

a supply conduit attached to said heating conduit, the supply conduit adapted to transfer the fluid toward the heating conduit, the supply conduit adapted to transfer the fluid away from the heating conduit;

a reflective surface adapted to reflect solar rays towards the heating conduit, said reflective surface adjustable on a first axis and a second axis, said reflective surface adapted to adjust in relation to said heating conduit;

an adjustment body adapted to pivot on a single axis, said supply conduit adapted to pivot with said adjustment body; said reflective surface pivotally connected to said adjustment body wherein the pivotal connection of the reflective surface to said adjustment body allows adjustment of the reflective surface on the first axis, wherein pivoting of the adjustment body allows adjustment of the reflective surface on the second axis;

an exchange conduit pivotally attached to said supply conduit, said exchange conduit adapted to allow said supply conduit pivot with said adjustment body, said exchange conduit adapted to allow the fluid to transfer from the supply conduit through the exchange conduit;

wherein the supply conduit is fixedly attached to said heating conduit, said heating conduit and supply conduit adapted to pivot with said adjustment body as said adjustment body pivots, said supply conduit and heating conduit adapted to remain fixed as said reflective surface pivots in relation to said adjustment body; and a conduit entrance of the adjustment body, said conduit entrance adapted to allow said supply conduit to enter said conduit entrance approximately perpendicular to the axes for pivoting the adjustment body wherein the supply conduit attaches to the exchange conduit exterior of the conduit entrance such that the supply conduit pivots in relation to the adjustment body and the exchange conduit does not pivot with the adjustment of the adjustment body.

2. The device of claim 1 further comprising:

a conduit exit of the adjustment body, said conduit exit adapted to allow said supply conduit to exit said conduit exit approximately perpendicular to the axes for pivoting the adjustment body wherein the supply conduit attaches to the exchange conduit exterior of the conduit exit such that the supply conduit pivots in relation to the adjustment body and the exchange conduit does not pivot with the adjustment of the adjustment body.

3. The device of claim 1 further comprising:

a pivot body secured to said adjustment body wherein said supply conduit pivots with said pivot body;

a base attached to said adjustment body, said adjustment body adapted to pivot in relation to said base;

a motor secured to said base, said motor adapted to pivot said pivot body for pivoting said adjustment body.

4. A device for collecting solar energy from solar rays comprising:

a heating conduit for heating a fluid, the heating conduit adapted to receive solar rays reflected from a reflective surface, the heating conduit having an entrance end and an exit end, the entrance end of the heating conduit allowing the fluid to enter the heating conduit, the exit end of the heating conduit allowing the fluid to exit the heating conduit;

a supply conduit attached to said heating conduit, the supply conduit adapted to transfer the fluid toward the heating conduit, the supply conduit adapted to transfer the fluid away from the heating conduit;

a reflective surface adapted to reflect solar rays towards the heating conduit, said reflective surface adjustable on a first axis and a second axis, said reflective surface adapted to adjust in relation to said heating conduit;

an adjustment body adapted to pivot on a single axis, said supply conduit adapted to pivot with said adjustment body; said reflective surface pivotally connected to said adjustment body wherein the pivotal connection of the reflective surface to said adjustment body allows adjustment of the reflective surface on the first axis, wherein pivoting of the adjustment body allows adjustment of the reflective surface on the second axis, wherein the supply conduit remains fixed in relation to said adjustment body as said adjustment body pivots on said single axis; and an exchange conduit pivotally attached to said supply conduit, said exchange conduit adapted to allow said supply conduit pivot with said adjustment body, said exchange conduit adapted to allow the fluid to transfer from the supply conduit through the exchange conduit;

wherein the supply conduit is fixedly attached to said heating conduit, said heating conduit and supply conduit adapted to pivot with said adjustment body as said adjustment body pivots, said supply conduit and heating conduit adapted to remain fixed as said reflective surface pivots in relation to said adjustment body; and a conduit entrance of the adjustment body, said conduit entrance adapted to allow said supply conduit to enter said conduit entrance approximately perpendicular to the axes for pivoting the adjustment body wherein the supply conduit attaches to the exchange conduit exterior of the conduit entrance such that the supply conduit pivots in relation to the adjustment body and the exchange conduit does not pivot with the adjustment of the adjustment body.

5. The device of claim 4 further comprising:

a conduit exit of the adjustment body, said conduit exit adapted to allow said supply conduit to exit said conduit exit approximately perpendicular to the axes for pivoting the adjustment body wherein the supply conduit attaches to the exchange conduit exterior of the conduit exit such that the supply conduit pivots in relation to the adjustment body and the exchange conduit does not pivot with the adjustment of the adjustment body.

6. The device of claim 5 further comprising:

a pivot body secured to said adjustment body wherein said supply conduit pivots with said pivot body;

a base attached to said adjustment body, said adjustment body adapted to pivot in relation to said base;

a motor secured to said base, said motor adapted to pivot said pivot body for pivoting said adjustment body.

7. An apparatus for collecting solar energy from solar rays comprising:

a heating conduit for heating a fluid, the heating conduit adapted to receive solar rays reflected from a reflective surface, the heating conduit having an entrance end and an exit end, the entrance end of the heating conduit allowing the fluid to enter the heating conduit, the exit end of the heating conduit allowing the fluid to exit the heating conduit;

a supply conduit attached to said heating conduit, the supply conduit adapted to transfer the fluid toward the heating conduit, the supply conduit adapted to transfer the fluid away from the heating conduit, the supply conduit fixedly attaches to said heating conduit, said heating conduit and supply conduit adapted to pivot with said adjustment body as said adjustment body pivots, said supply conduit and heating conduit adapted to remain fixed as said reflective surface pivots in relation to said adjustment body;

a reflective surface adapted to reflect solar rays towards the heating conduit, said reflective surface adjustable on a first axis and a second axis, said reflective surface adapted to adjust in relation to said heating conduit;

an adjustment body adapted to pivot on a single axis, said supply conduit adapted to pivot with said adjustment body; said reflective surface pivotally connected to said adjustment body wherein the pivotal connection of the reflective surface to said adjustment body allows adjustment of the reflective surface on the first axis, wherein pivoting of the adjustment body allows adjustment of the reflective surface on the second axis, wherein the supply conduit remains fixed in relation to said adjustment body as said adjustment body pivots on said single axis;

an exchange conduit pivotally attached to said supply conduit, said exchange conduit adapted to allow said supply conduit pivot with said adjustment body, said exchange conduit adapted to allow the fluid to transfer from the supply conduit through the exchange conduit;

a pivot body secured to said adjustment body wherein said supply conduit pivots with said pivot body;

a base attached to said adjustment body, said adjustment body adapted to pivot in relation to said base;

a motor secured to said base, said motor adapted to pivot said pivot body for pivoting said adjustment body; and a conduit entrance of the adjustment body, said conduit entrance adapted to allow said supply conduit to enter said conduit entrance approximately perpendicular to the axes for pivoting the adjustment body wherein the supply conduit attaches to the exchange conduit exterior of the conduit entrance such that the supply conduit pivots in relation to the adjustment body and the exchange conduit does not pivot with the adjustment of the adjustment body.

8. An apparatus for collecting solar energy from solar rays comprising:

a heating conduit for heating a fluid, the heating conduit adapted to receive solar rays reflected from a reflective surface, the heating conduit having an entrance end and an exit end, the entrance end of the heating conduit allowing the fluid to enter the heating conduit, the exit end of the heating conduit allowing the fluid to exit the heating conduit;

a supply conduit attached to said heating conduit, the supply conduit adapted to transfer the fluid toward the heating conduit, the supply conduit adapted to transfer the fluid away from the heating conduit, the supply conduit fixedly attaches to said heating conduit, said heating conduit and supply conduit adapted to pivot with said adjustment body as said adjustment body pivots, said supply conduit and heating conduit adapted to remain fixed as said reflective surface pivots in relation to said adjustment body;

a reflective surface adapted to reflect solar rays towards the heating conduit, said reflective surface adjustable on a first axis and a second axis, said reflective surface adapted to adjust in relation to said heating conduit;

an adjustment body adapted to pivot on a single axis, said supply conduit adapted to pivot with said adjustment body; said reflective surface pivotally connected to said adjustment body wherein the pivotal connection of the reflective surface to said adjustment body allows adjustment of the reflective surface on the first axis, wherein pivoting of the adjustment body allows adjustment of the reflective surface on the second axis, wherein the supply conduit remains fixed in relation to said adjustment body as said adjustment body pivots on said single axis;

an exchange conduit pivotally attached to said supply conduit, said exchange conduit adapted to allow said supply conduit pivot with said adjustment body, said exchange conduit adapted to allow the fluid to transfer from the supply conduit through the exchange conduit;

a pivot body secured to said adjustment body wherein said supply conduit pivots with said pivot body;

a base attached to said adjustment body, said adjustment body adapted to pivot in relation to said base;

a motor secured to said base, said motor adapted to pivot said pivot body for pivoting said adjustment body; and a conduit exit of the adjustment body, said conduit exit adapted to allow said supply conduit to exit said conduit exit approximately perpendicular to the axes for pivoting the adjustment body wherein the supply conduit attaches to the exchange conduit exterior of the conduit exit such that the supply conduit pivots in relation to the adjustment body and the exchange conduit does not pivot with the adjustment of the adjustment body.

\* \* \* \* \*